March 30, 1926.
P. RADOSEVIC
1,578,363
BEARING SHAVING AND BURNISHING DEVICE
Filed Oct. 16, 1923  3 Sheets-Sheet 3
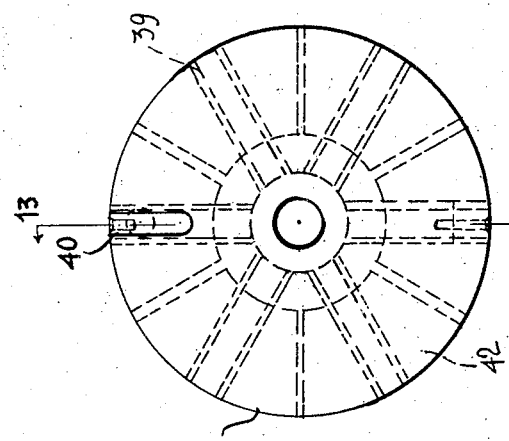
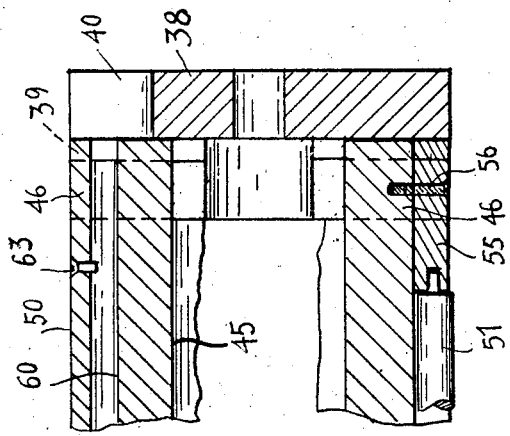
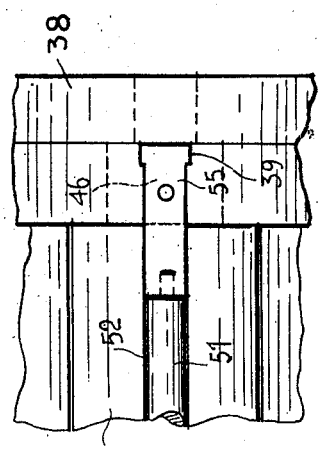
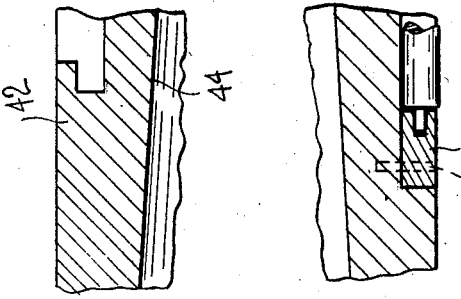
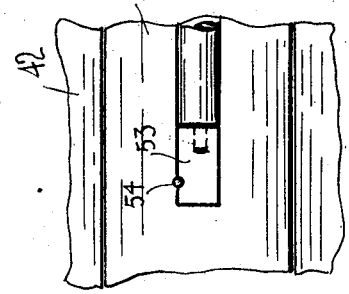
PETER RADOSEVIC
Inventor
By his Attorney Julian J. Wittel Patented Mar. 30, 1926.

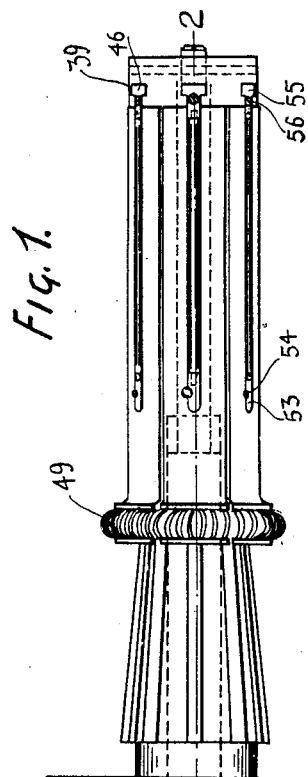
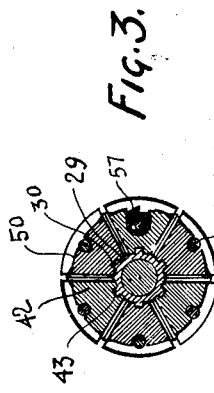
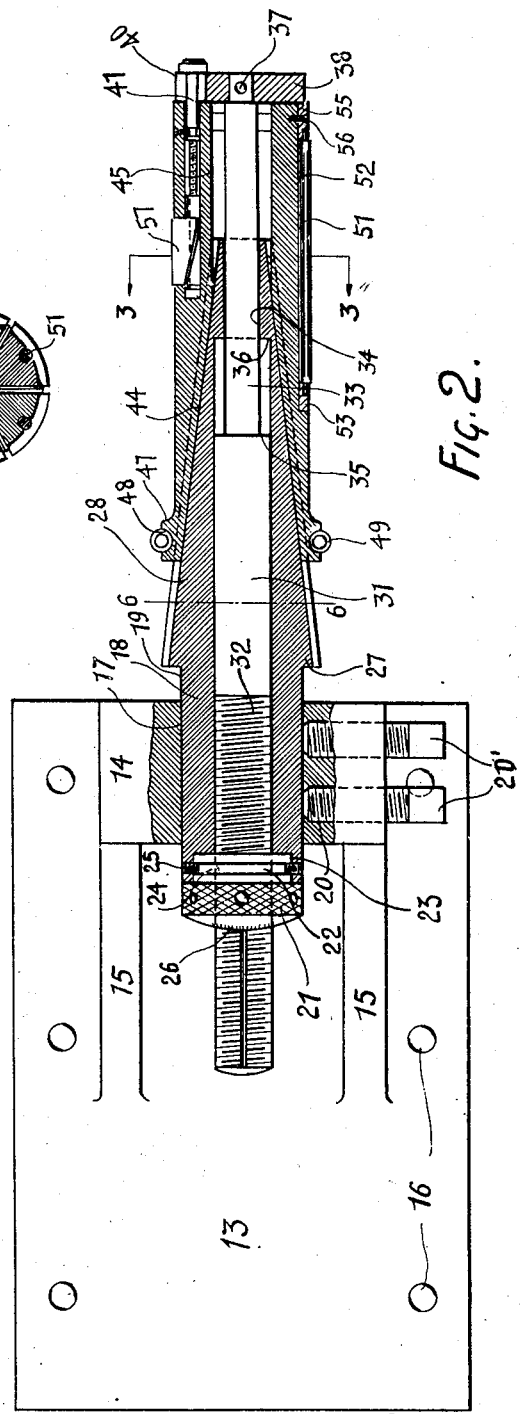

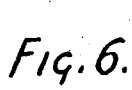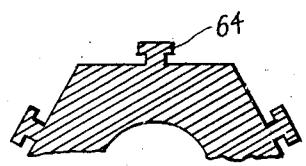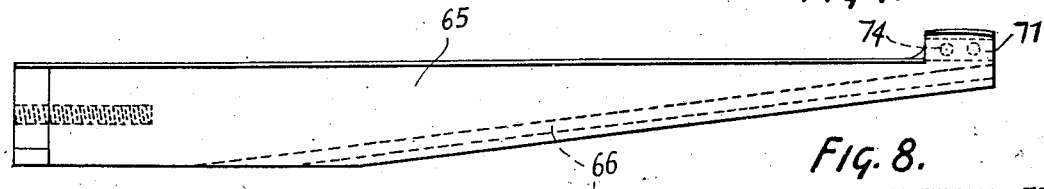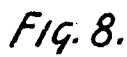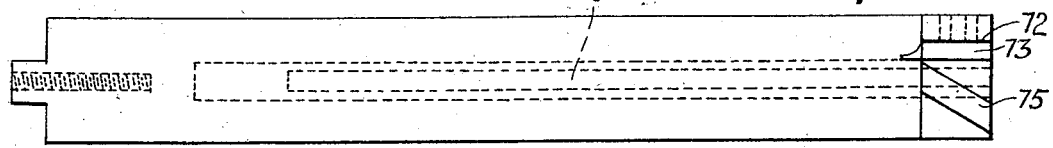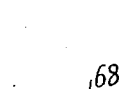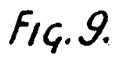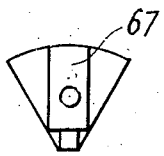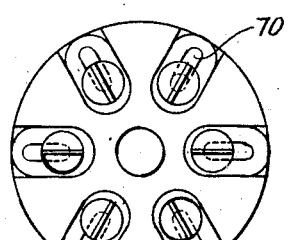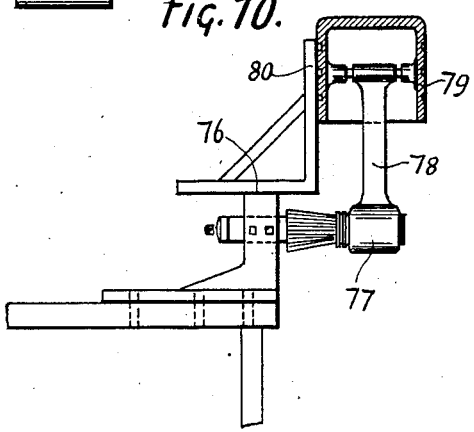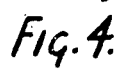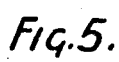

1,578,363

UNITED STATES PATENT OFFICE.

PETER RADOSEVIC, OF NEW YORK, N. Y.

BEARING SHAVING AND BURNISHING DEVICE.

Application filed October 16, 1923. Serial No. 668,942.

*To all whom it may concern:*

Be it known that I, PETER RADOSEVIC, a citizen of the United States, and resident of New York, in the county of New York and State of New York, have invented certain new and useful Improvements in Bearing Shaving and Burnishing Devices, of which the following is a specification.

My invention relates to a novel and improved tool of the reaming class designed to be used in cleaning, burnishing, reaming, cutting, fitting and facing operations and in all other similar and kindred capacities for which it may be adapted.

The invention aims to provide certain improvements especially applicable in operating on valves, seats, chambers, bearings and the like, and it consists in the combinations, arrangements and constructions herein described and claimed.

Another object of my invention is the provision of a tool of the class specified, which will be conducive greatly toward simplication and effectiveness of construction, to convenience, efficiency and reliability in service, and which will admit of the use of various changes in connections and tools without changing or altering the principle of construction.

Another object of the invention is the propision of a tool of this character embodying a plurality of longitudinal tool strips arranged in circular series in the form of a cylinder and about a fixed conically shaped body on which they may be advanced or retracted as an entirety, varying their circumferential dimension but always maintaining their cylindrical form, the said tool strips being so constructed and mounted that they may be used either as operating tools themselves or as means for holding other operating tools, as cutting knives and rollers.

Another object of the invention is the provision of a tool embodying the features specified, wherein radial movements, both outwardly and inwardly, of the cylindrically arranged tool strips may be effected by the turning of an actuating nut, on which may be inscribed micrometer indicia whereby readily and accurately to obtain the degree of adjustment desired.

Other objects and advantages will appear in the following specification, and one of the practical embodiments of the invention together with certain modified features thereof is illustrated in the accompanying drawings, forming a material part of this specification, and in which:—

Fig. 1 is a side elevation of a device made in accordance with my invention;

Fig. 2 is a top plan view thereof, the base being partly broken away and the tool proper being shown throughout its length in horizontal section;

Fig. 3 is a cross section, taken on the line 3—3 of Fig. 2;

Fig. 4 is an enlarged sectional detail of one of the longitudinal tool strips, illustrating the same as equipped with an adjustable cutting device.

Fig. 5 is a cross section, taken on the line 5—5 of Fig. 4;

Fig. 6 is a fragmental cross section, taken approximately on the line 6—6 of Fig. 2 and illustrating a modified form of feather;

Figs. 7 and 8 are views in elevation and plan, respectively, of a modified form of the tool strips;

Fig. 9 is a front end view of the part shown in Fig. 7;

Figs. 10 and 11 are views in side and end elevation, respectively, showing a modification in adjustably connecting the tool strips with the disk-shaped head;

Fig. 12 is a diagram in elevation illustrating the use of my improved tool in testing bearings and pistons.

Figs. 13, 14, and 15 are enlarged fragmentary sectional, bottom plan, and front elevational views, respectively, of the tool strips of my device with the guide head provided for them, certain parts having been removed.

In carrying out my invention, I provide a suitable base or support, preferably consisting of a relatively heavy casting 13, made at its forward end with a standard 14 centrally rising therefrom and having connecting webs 15. The casting 13 is preferably provided with apertures as 16 whereby to be secured by bolts, screws or otherwise to a suitable work bench or other support. In a direction lengthwise of the casting, the standard is holed through at 17 for the mounting therein of a tubular body or barrel 18, which for this purpose, is provided with a plain cylindrical rear surface 19, and the standard 14, in communication with the hole 17, is provided with threaded openings 20 for the reception of the set screws 20' whereby rigidly to secure the tubular body in the standard.

21 denotes an actuating nut, made with a shank 22 to have turning fit in a suitable concentric bore 23 provided in the rear end of the tubular body, said shank 22 being provided with an annular groove 24 adapted to receive the ends of the screws 25 radially set in the tubular body. Said actuating nut is thus removably secured in the rear end of the tubular body for turning movement therein and a portion of its exposed periphery is knurled in a manner well understood to facilitate the turning of the nut by the hand, and at 26 on its rear curved face there is preferably provided the indicia and symbols of a micrometer scale for a purpose to be hereinafter more fully referred to.

The plain portion 19 of the tubular body merges into an expanded portion 27, from which point the device tapers towards its front end. In the present exemplification, this tapering portion, denoted generally by the numeral 28, is of hexagonal form in cross section, having six substantially flat sides as 29 (Fig. 3) although, if desired, this tapering portion may be made in the form of a true cone. At the center of each flat surface 29 there is provided a longitudinal rib or feather key 30, and it will be understood these ribs or feathers thus made on the surfaces 29 necessarily converge from the expanded region 27 to the front end of the tubular body.

31 denotes an actuating shaft which is of considerably longer dimension than the tubular body and which has a turning fit therein. The rear portion of this shaft is provided with screw threads 32 for co-operation with the nut 21 whereby said shaft may be advanced and retracted lengthwise of the tubular body, and the forward portion 33 of the same is made of reduced diameter to correspond with a reduction 34 provided in the bore of the tubular body, these reductions providing co-operating shoulders 35 and 36 which serve as stops to limit the forward advance of the shaft.

Pinned at 37 upon the extreme forward end of the actuating shaft is a disk-shaped head 38 in the rear face whereof is provided a plurality of slots 39 which extend radially outwardly to the circumference of the disk and which are of T shape in cross contour as clearly shown in Figs. 1, 13, 14, and 15. In the present embodiment there are six of these slots corresponding in number with six of the feathers on the tubular body. In the portion of the head corresponding with the sixth feather a radial opening 40 may also be cut for the accommodation of an adjusting screw 41 to be hereinafter more particularly referred to.

Slidable upon each of the flat surfaces 29 formed on the tapering portion of the tubular body is a tool strip or finger 42 having a longitudinal recess 43 for the reception of the feather 30, the inner portion 44 in which said recess is formed being tapered in agreement with the tubular body and the inner portion 45, forwardly thereof, being untapered. The general form in cross section of each of these tool strips is like that of a sector of a circle, and these tool strips when arranged in circular series about the tapering portion of the tubular body form a cylindrical entirety. In the form shown in Figs. 1 and 2, each of the tool strips 42 has formed on its forward end a T-shaped lug 46 adapted to fit and have radial movement in the T-shaped slot 39 provided in the head 38. Adjacent its rearward end each of the tool strips is made with an exterior arcuate enlargement 47 in which is provided an arcuate seat or recess 48. When the tool strips are assembled in cylindrical form these seats or recesses 48 come in circular continuity, and in order expansively to tie the tool strips together at this end, I set in said recesses an expansive band 49, which preferably consists of a helical spring. Because of the lug and slot connections at their forward ends with the head 38 and of the expansile band connection at their rear ends, the tool strips while sliding upon their feathers are adapted as an entirety to have radial outward movement when the actuating shaft is retracted and to have radial inward movement when said shaft is advanced.

The outer surfaces 50 of the tool strips are adapted to be used in cleaning, polishing, abrading, or reaming operations in a manner well understood by those skilled in the art, it being obvious that the article having the bearing, seat, chamber or other surface to be operated upon, is mounted and rotated upon the tool strips, which have first been set to the circumference desired by manipulating the actuating screw 21.

In the exemplifications herein shown, five of the tool strips are equipped with rollers 51, for use in polishing, burnishing and in many other operations. These rollers are set in recesses 52 provided in said tool strips, longitudinally thereof. These rollers are rotatably journaled as follows: at their rear ends in blocks 53 which are countersunk in the surfaces of the tool strips and are secured in position by pins 54 as best shown in Figs. 1, 13 and 14: at their front ends in other blocks 55 also countersunk in the surfaces of the tool strips, the same being secured in position by screws 56.

In the tool strip which comes opposite the adjusting screw 41, there is provided, in this exemplification, an adjustable cutting tool 57 having mortised engagement, as best shown in Fig. 5, with a base plug 58, both said tool 57 and the plug 58 therefore being entered in a suitable longitudinal slot 59. Said base plug 58 is threaded upon the adjustment screw 41 which extends forwardly through a bore 60 in the tool strip (Fig. 4) and then traverses the radially extended opening 40 in the head 38 in front of which it is provided with a turning knob 61. Said screw has an annular slot 62 into which projects a set screw 63 tapped through the surface of the tool strip and which serves to prevent longitudinal displacement, while permitting its ready removal for the replacement of the cutting tool 57. Obviously the cutting tool 57 and the rollers 51 are thus arranged and supported so that they may operate effectively slightly beyond the outer surfaces 50 of the tool strips.

In Figure 6, I illustrate a T-shaped type or rib or feather which may be formed on the flat surfaces of the tubular body. This T-shaped form of feather, which is denoted by the numeral 64, is intended to be used in connection with a modified form of tool strip 65 (Figs. 7 and 8), wherein is provided a co-operating T-shaped slot 66, and the forward ends of which are mortised as at 67 in a disk-shaped head 68, said mortise constructions being of radial extent (Fig. 9), and said tool strips being held for radial movement in relation to said head by means of screws 69 which extend through said mortised joints (Fig. 9), provision being made for the radial movement of said screws by cutting elongated, radially-directed slots 70 in said head (Fig. 11). Under this modified construction, no expansive band is required at the forward ends of the tool strips, since the T-shaped feathers hold them to position while permitting the necessary sliding movements.

The absence of this band may be utilized to advantage by providing arcuate projections or housings 71, slotted at 72 in a manner suitable for the reception of a cutting tool or knife 73, which is held in position by screws 74 or other securing means. A further slot 75 is provided in the projection for the ready escape of chips or other residue resulting from the biting of the cutting tool into the article operated upon. These knives 73 provide facilities for effecting the so called "facing" of the bearing and for other purposes unnecessary to state here.

In Figure 12, I illustrate, diagrammatically, how my improved tool may be employed in testing whether the crank pin bearing of a connecting rod has its center axis truly perpendicular to the working surface of the piston or vice versa. To accomplish this, the top end 76 of the standard 14 is made parallel with the central longitudinal axis of the tubular body 18. The bearing 77 is applied to the tool, with connecting rod 78 and piston 79 held in a vertical position, whereupon a square 80 is applied in the manner shown to bring one arm horizontally upon the top end 76 of the standard and the other arm vertically abutting the piston. If the bearing and the sides of the piston are not truly perpendicular to one another, this test will show a variation between the vertical arm of the square and the sides of the piston.

What I claim as new is:—

1. In a device of the class described, a supported tubular body having a tapering end portion provided with a plurality of longitudinal feathers; a nut having feathered engagement with the opposite end of said tubular body; a shaft extending through said tubular body and having threaded engagement with said nut whereby to be reciprocated; a plurality of longitudinal tool strips arranged in circular series around said tapering end portion, a disk-shaped head pinned to the forward end of said shaft; means for keying the forward ends of said tool strips in said head to permit radial movement of the former; and means for connecting the opposite ends of said tool strips to permit radial movement thereof.

2. In a device of the class described, a support, a tubular body fitted therein having a tapering end portion provided with a plurality of longitudinal and converging feathers; a nut having feathered engagement with the opposite end of said tubular body; a shaft having threaded engagement with said nut, said shaft extending through said tubular body and adapted to be reciprocated by said nut; a plurality of longitudinal tool strips arranged in circular series around said tapering end portion, a disk-shaped head pinned to the forward exposed end of said shaft, lug and slot connections between the tool strip and said head to permit outward movement of the former; means for connecting the opposite ends of said tool strips to permit relative outward movement thereof whereby said tool strips may be moved outwardly and inwardly accordingly as said nut is moved and an adjustable cutting tool incorporated in one of said tool strips.

3. In a device of the class described, a support, a tubular body fitted therein having a tapering end portion provided with a plurality of longitudinal and converging feathers; a nut having feathered engagement with the opposite end of said tubular body; a shaft having threaded engagement with said nut to be reciprocated thereby and extending through said tubular body; a plurality of longitudinal tool strips arranged in circular series around said tapering end portion, a disk-shaped head pinned to the forward exposed end of said shaft; means for keying the forward ends of said tool strips in said head for radial movement therein; means for connecting the opposite ends of said tool strips to permit radial adjustment thereof whereby said tool strips may be together moved outwardly and inwardly accordingly as said nut is moved and a roller device incorporated in one of said tool strips.

4. In a device of the class described, a support provided with a tubular body having a tapering end portion, a shaft having a threaded portion at one end and a plain portion extending through said tubular body, means for reciprocating said shaft, a disk-shaped head secured to the exposed forward end of said shaft, a plurality of longitudinal tool strips arranged in circular series around said tapering end portion, means comprising longitudinal feathers provided on said tapering end portion and on which said tool strips may slide, connections between the forward ends of said tool strips and said head permitting limited outward movement of said strips, means for connecting the opposite ends of said strips to permit relative outward movement thereof whereby said tool strips may be together forced outwardly or drawn inwardly accordingly as said shaft is reciprocated.

5. In a device of the class described, the combination with a tapering body having a plurality of feathers extending lengthwise thereof, of a plurality of longitudinal tool strips grooved for sliding upon said feathers, a reciprocating element arranged adjacent the smaller end of said tapering body, connections between said tool strips and said reciprocating element permitting a limited outward movement of the former, means connecting the opposite ends of said tool strips and permitting relative outward movement thereof, and means for actuating said reciprocating element.

6. In a device of the class described, the combination with a tapering body having a plurality of feathers extending lengthwise thereof, of a plurality of longitudinal tool strips grooved for sliding upon said feathers, a reciprocating element of said tapering body, connections between said tool strips and said reciprocating element permitting a limited outward movement of the former, means connecting the opposite ends of said tool strips and permitting relative outward movement thereof, means for actuating said reciprocating element and a cutting tool arranged in one of said tool strips.

7. In a device of the class described, the combination with a tapering body having a plurality of feathers extending lengthwise thereof, of a plurality of longitudinal tool strips loosely slidable upon said feathers, a reciprocating element of said tapering body, connections between said tool strips and said reciprocating element permitting a limited outward movement of the former, means connecting the opposite ends of said tool strips and permitting relative outward movement thereof, means for actuating said reciprocating element and a roller in one of the tool strips.

8. The combination of a tubular body having a plain portion and a tapering portion, means for supporting said body at its plain portion, a shaft extending through said tubular body, and threaded at its rear end, means turnable on said tubular body and threaded on said shaft whereby to reciprocate the latter, a plurality of longitudinal tool elements, arranged about the tapering portion of said tubular body, means in connection with the forward end of said shaft and each of said tool elements whereby to force limited inward and outward movements of said tool elements on reciprocating said shaft, and means comprising an annular expansile spring connecting the rear ends of said tool elements to permit limited radial movement of the same.

9. The combination of a tubular body having a plain portion and a tapering portion, means for supporting said body at its plain portion a shaft extending through said tubular body, and threaded at its rear end, means turnable on said tubular body and threaded on said shaft whereby to reciprocate the latter, a plurality of longitudinal tool elements, arranged about the tapering portion of said tubular body, means in connection with the forward end of said shaft and each of said tool elements whereby to force limited inward and outward movements of said tool elements on reciprocating said shaft, means comprising an expansile spring band connecting the rear ends of said tool elements to permit a limited radial movement of the same, and cutting and burnishing tools set in said tool elements.

10. A bearing scraping and burnishing device, comprising a support, a tubular body having a converging front portion and a plain rear portion, said rear portion being removably and adjustably secured into said support and said converging front portion carrying a plurality of feathers on its outer surface, tool strips slidably engaging said feathers and forming a cylindrical shell, a shaft passing through the center of said tubular body, having a threaded rear portion, an actuating nut co-operating with said threaded portion and having feathered engagement with said tubular body a head disk secured to the shaft at its front end, radial key slots in said disk and corresponding keys formed at the front ends of said tool strips, a yielding member consisting of a spiral spring, connecting the rear ends of said tool strips, and an adjustable knife in one of said tool strips.

11. In a device of the character described, a tubular body having a converging front portion, a plurality of longitudinally converging feathers arranged on the outer surface of said tubular body, a plurality of tool strips having key slots cut into their inside surfaces in engagement with said feathers, said feathers and said key slots being of such cross section that they will prevent a radial removal of said tool strips from the tubular body while permitting their longitudinal reciprocation, a central shaft slideably passing through said body and adapted to be reciprocated therein, a head disk secured to the front end of said shaft, and means to secure the front ends of said tool strips to said head disk to allow a limited inward or outward radial movement of said tool strips.

12. In a device of the character described, a tubular body having a converging front portion, a plurality of longitudinally converging feathers arranged on the outer surface of said tubular body, a plurality of tool strips having key slots cut into their inside surfaces in engagement with said feathers, said feathers and said key slots being of such cross section that they will prevent a radial removal of said tool strips from tubular body while permitting their longitudinal reciprocation, a central shaft slideably passing through said body and adapted to be reciprocated therein, a head disk secured to the front end of said shaft, means to secure the front ends of said tool strips to said head disk to allow a limited inward or outward radial movement of said tool strips, one of said tool strips having a raised rear portion and carrying a bearing facing knife secured therein.

13. In a device of the character described, a plurality of tool strips forming an expansile shell, a bearing scraping knife arranged in one of said tool strips, a base plug with which said knife has mortised engagement, a screw passing through said base plug and rotatably secured in said tool strip, said base plug being adapted to be reciprocated in said tool strip by said screw and to raise or to lower said knife thereby.

14. In a device of the character described, a support, a tubular body having a converging front portion, expansile shell elements on said converging front portion, a screw passing through said tubular body adapted to reciprocate said shell elements on said converging front portion, and a top surface on said support being in the form of a plane parallel to the center axis of the shell elements.

Signed at New York in the county of New York and State of New York this 21st day of September A. D. 1923.

PETER RADOSEVIC.